(12) United States Patent
Kabat et al.

(10) Patent No.: US 6,609,499 B2
(45) Date of Patent: Aug. 26, 2003

(54) GASEOUS-FUEL INJECTION SYSTEM AND METHOD

(75) Inventors: Daniel Michael Kabat, Oxford, MI (US); Xiaoguo Tang, Canton, MI (US); William Francis Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 09/683,016

(22) Filed: Nov. 8, 2001

(65) Prior Publication Data
US 2003/0084877 A1 May 8, 2003

(51) Int. Cl.$^7$ ............................................... F02M 21/00
(52) U.S. Cl. ....................... 123/432; 123/527; 123/469; 123/470
(58) Field of Search ................. 123/432, 527, 123/468, 469, 470, 302

(56) References Cited

U.S. PATENT DOCUMENTS

| | | | | |
|---|---|---|---|---|
| 4,071,001 A | * | 1/1978 | Goto ........................... | 123/260 |
| 4,072,136 A | * | 2/1978 | Noguchi et al. ............. | 123/260 |
| 4,095,565 A | * | 6/1978 | Noguchi et al. ............. | 123/293 |
| 4,111,161 A | * | 9/1978 | Ueno et al. ................... | 123/3 |
| 4,556,037 A | * | 12/1985 | Wisdom ...................... | 123/531 |
| 4,640,234 A | * | 2/1987 | Olsson et al. ............... | 123/557 |
| 4,669,434 A | * | 6/1987 | Okumura et al. ........... | 123/308 |
| 4,969,446 A | * | 11/1990 | Olsson et al. ............... | 123/585 |
| 5,150,691 A | | 9/1992 | Imajo | |
| 5,237,981 A | * | 8/1993 | Polletta et al. .............. | 123/527 |
| 5,450,829 A | * | 9/1995 | Beck ........................... | 123/435 |
| 5,673,673 A | | 10/1997 | Beck | |
| 5,735,248 A | | 4/1998 | Matsuura et al. | |
| 5,738,076 A | * | 4/1998 | Kim ............................ | 123/527 |
| 5,832,905 A | * | 11/1998 | King et al. .................. | 123/525 |
| 6,510,837 B1 | * | 1/2003 | Aoyama ..................... | 123/308 |

* cited by examiner

Primary Examiner—Hieu T. Vo
Assistant Examiner—Hai Huynh

(57) ABSTRACT

A fuel injection system for a gaseous-fueled engine is provided. The fuel injection system comprises at least one gaseous fuel injector for each of the engine cylinders, wherein each fuel injector is located proximate the intake manifold. A guide tube connects each of the gaseous fuel injectors to at least one of the intake ports. The guide tube comprises a fluid passage arranged within the respective intake port substantially tangent and adjacent to an interior wall of the intake port and directed toward the respective intake valve. The guide tube is adapted to deliver high-pressure gaseous fuel from the injector to the respective combustion chamber along the interior wall of the intake port. In this way, the high velocity peripheral fuel charge creates a lower pressure central core within the intake part which, in turn, increases the overall intake charge flow and engine volumetric efficiency.

15 Claims, 2 Drawing Sheets

GASEOUS-FUEL INJECTION SYSTEM AND METHOD

BACKGROUND OF INVENTION

1. Technical Field

The present invention relates generally to vehicle fuel systems, and more particularly, concerns a fuel injection system for gaseous-fueled internal combustion engines.

2. Background

Alternative fuel systems have become an ever-greater concern in the search to conserve energy and emission control. The development of alternative energy sources for use in automotive vehicles is a goal of automobile manufacturers. The alternative energy sources must provide the required power needed to operate the vehicle, and at the same time be energy efficient, reduce emissions, and be cost effective. One such alternative energy source under consideration is a hydrogen-fueled internal combustion engine. Natural gas has also long been considered an alternative fuel for internal combustion engines.

A problem with using gaseous fuels for part injection engines such as natural gas or hydrogen, however, is reduced power output when compared to liquid fuel such as gasoline due mostly to the loss in volumetric efficiency. For example, in the case of natural gas, the proportion of the volume of the fuel/air mixture occupied by the fuel is approximately 10%. In the case of hydrogen, the proportion of the volume of the fuel/air mixture occupied by the fuel is approximately 30% at stoichiometry. In contrast, in liquid-fueled engines, the proportion of the volume of the fuel/air mixture occupied by the fuel is approximately 1.5%. Thus, for gaseous-fueled engines, the proportion of intake air in the fuel/air mixture decreases by an amount corresponding to the increase in the volume of the fuel component. As compared to a gasoline engine or a diesel engine, the amount of intake air decreases and the volumetric efficiency and the engine output decreases as well. To increase the volumetric efficiency, a larger quantity of fresh air must be inducted into the engine cylinders for a given quantity of fuel injected. Thus, there exists a need for gaseous-fuel injection systems which result in improved engine volumetric efficiency.

SUMMARY OF INVENTION

In the present invention, the aforementioned problem is solved through the provision of a novel gaseous fuel injection system whereby gaseous fuel is injected at a high velocity along the periphery of the intake port thereby creating a local lower pressure central core which in turn increases the overall intake charge flow and, hence, volumetric efficiency of the engine. The high pressure gaseous fuel is directed by guide tubes or formations in the intake port along the walls of the intake port, toward the intake valve opening and, in a preferred embodiment, is injected after the start of induction.

In one embodiment, a fuel injection system for a gaseous-fueled engine is provided. The engine comprises a plurality of cylinders each defining a combustion chamber and associated with at least one intake port in fluid communication with an intake manifold and separated from the combustion chamber by an intake valve operable between an open and closed position. The fuel injection system comprises at least one gaseous fuel injector for each of the engine cylinders, wherein each fuel injector is located proximate the intake manifold. A guide tube connects each of the gaseous fuel injectors to at least one of the intake ports. The guide tube comprises a fluid passage arranged within the respective intake port substantially tangent and adjacent to an interior wall of the intake port and directed toward the respective intake valve. The guide tube is adapted to deliver high-pressure gaseous fuel from the injector to the respective cylinder along the interior wall of the intake port. In this way, the high velocity peripheral fuel charge creates a lower pressure central core within the intake port which, in turn, increases the overall intake charge flow and engine volumetric efficiency.

An advantage of the present invention is that it improves the volumetric efficiency of gaseous-fueled internal combustion engines. Other advantages of the invention will become apparent reading the following detailed description and appended claims, and upon reference of the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
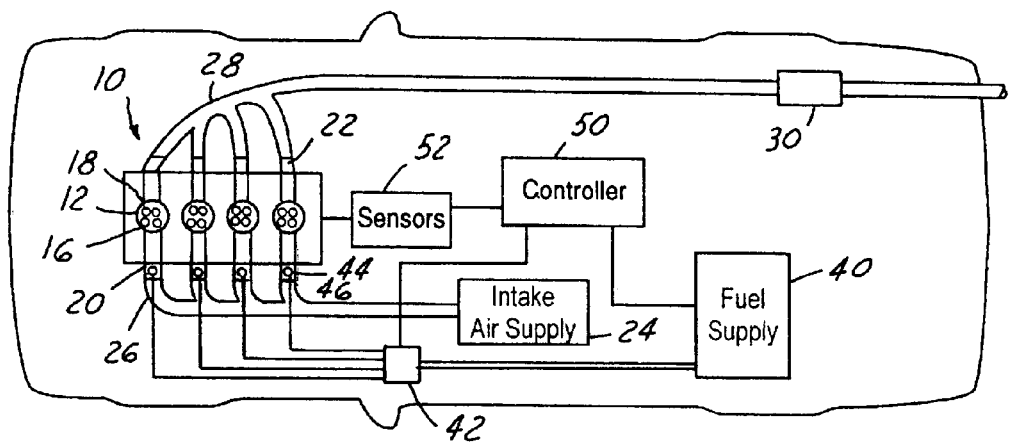
FIG. 1 is a schematic diagram of a gaseous-fueled injection system in accordance with one embodiment of the present invention.

Referring now to FIG. 1 there is shown a schematic diagram of a gaseous-fueled engine system in which the present invention may be used to advantage. The injection system of the present invention is adaptable with either a compression ignition type engine or a spark ignition type engine and with either a throttled engine or an unthrottled engine. The illustrated engine 10 is a spark ignition type gaseous-fueled engine.

The engine 10 has a plurality of cylinders 12 capped with a cylinder head. A piston is slidably disposed in the bore of each cylinder 12 to define a combustion chamber between the cylinder head and the piston as it known in the art. The piston is also connected to a crankshaft in a conventional manner. Conventional intake and exhaust valves 16 and 18, disposed at the ends of respective intake and exhaust ports 20 and 22 in the cylinder head are actuated by a cam shaft as is known in the art so as to control the supply of air/fuel mixture to the piston combustion chambers and exhaust the combustion products therefrom. Intake air from an intake air supply 24 such as the atmosphere is supplied to the engine cylinders 12 by the air intake manifold 26. Combustion gases are exhausted from the engine cylinders 12 by the exhaust manifold 28. An exhaust after-treatment system 30 may be included for emissions control.

Gaseous fuel is supplied to the engine 10 from fuel supply 40 and fuel controller 42 which actuates a plurality of fuel injectors 44, 46. In this example, the engine 10 is a dual injector engine having two injectors for each cylinder 12. It should also be understood that although two injectors 44, 46 are illustrated per cylinder 12, one or more injectors could be provided for each cylinder or for each intake port of the engine 10.

Engine operation is controlled by controller 50 which is preferably a microprocessor based controller such as a computer having a central processing unit, memory in the form of RAM and/or ROM, associated inputs and outputs, and a communication bus. Controller 50 monitors engine performance and by receiving a plurality of signals from sensors 52 which include a conventional engine sensor set such as an intake manifold pressure sensor and air temperature sensor, mass airflow sensor, engine speed sensor, and exhaust gas oxygen sensor. Controller 50 also communicates with fuel controller 42 which may be separate from controller 50 to activate fuel injectors 44, 46.

Figure 2:
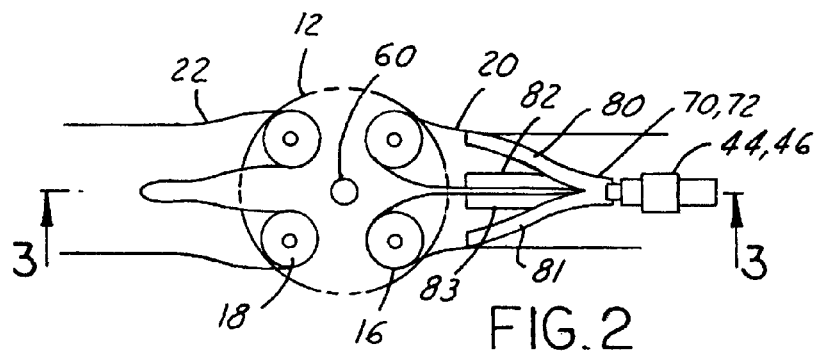
FIG. 2 is a plan view of a fuel injector, cylinder and intake port arrangement according to an embodiment of the present invention.
Figure 3:
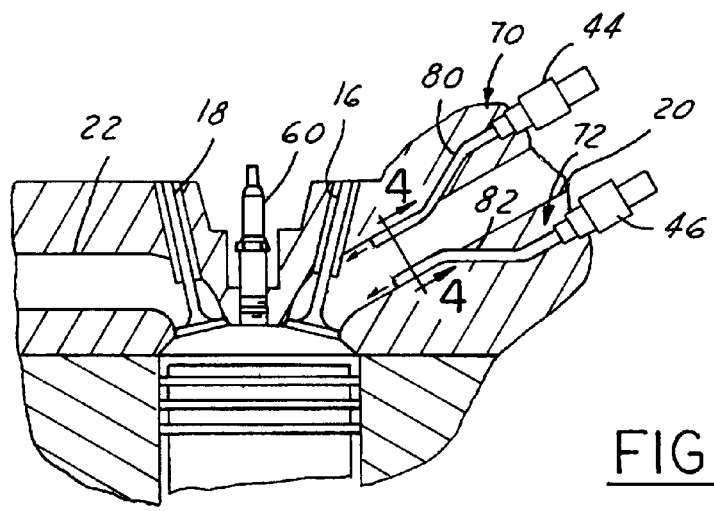
FIG. 3 is a partial vertical sectional view of a fuel injector, cylinder and intake port according to FIG. 2 along line 3—3.

Referring now to FIG. 2 there is shown a plan view of one of the cylinders 12 of engine 10. FIG. 3 is a partial vertical sectional view of the cylinder 12, intake port 20 and fuel injector arrangement of FIG. 2 along line 3—3. As can be seen in FIG. 2, each cylinder 12 comprises two intake ports 20 and two exhaust ports 22 in communication with respective intake valves 16 and exhaust valves 18. In the case of a spark-ignited engine as shown, each cylinder also includes a sparking device 60 such as a spark plug. Of course, in a compression ignition type engine, sparking device 60 would not be present.

The gaseous fuel injectors 44, 46 deliver the fuel such as hydrogen or compressed natural gas (CNG) to the intake ports 20 by way of guide tubes 70, 72. Guide tubes 70, 72 are positioned such that the high-pressure gaseous fuel is delivered along the interior peripheral surface of intake ports 20.

The forked guide tubes 70, 72 associated with high-pressure gaseous fuel injectors 44, 46, respectively, can also be seen in FIG. 3. Again, guide tubes 70, 72 direct the high-pressure gaseous fuel along the interior peripheral surface of intake port 20.

As shown in FIGS. 2 and 3, each guide tube 70, 72 comprises a conduit having two branches 80, 81, 82, 83 with one branch 80, 82 of each guide tube 70, 72 in one branch of the intake port 20 and the other branch 81, 83 of each guide tube 70, 72 in the other branch of intake port 20. Each branch 80, 81, 82, 83 forms a fluid conduit for conveying the high-pressure gaseous fuel along the peripheral interior surface of the intake port. Preferably, the branches 80, 81, 82, 83 of the guide tubes 70, 72 terminate a short distance prior to the intake valve opening. In this way, the high velocity peripheral fuel change is allowed to act as an air acceleration for the intake airflow.

Alternative arrangements of the guide tubes are also contemplated. For example, in a single injector per cylinder engine having two intake ports, the guide tube may have two branches as shown or four or more branches to distribute the high velocity fuel charge about the periphery of the intake port 20. Also, in a two-injector arrangements having two intake ports per cylinder, each injector may be arranged to inject fuel only to a single intake port. In such a case, both branches of each guide tube would be within a single intake port In operation, gaseous fuel from the fuel supply 40 is injected into the intake air stream in the intake port 20 at a predetermined time and for a predetermined duration as dictated by controllers 50, 42 by the high pressure gaseous fuel injectors 44, 46. Injectors 44, 46 are preferably electronically controlled injectors with a pulse-width modulated duty cycle which dictates the duration of the fuel injection. Because the gaseous fuel is injected at a pressure which is much higher than the static pressure in the intake port 20 (sonic fuel injection), for example, a fluidic condition referred to as the Coanda effect is created. In such a case, the high velocity peripheral gaseous fuel creates a lower pressure central core within the intake port which, in turn, increases the overall intake charge flow and volumetric efficiency of the engine cycle. In this regard, the guide tubes 70, 72 act as air amplifiers.

Experimental testing with hydrogen engines wherein sonic velocity hydrogen fuel is directed at the intake valve opening, and timed after the start of induction, has demonstrated volumetric efficiency increases on the order of 5 to 10%. Moreover, as the fuel injection duration increases such as with increasing RPM, the volumetric efficiency increases as well. An important aspect of the invention, however, is that gaseous fuel exits the guide tubes 70, 72 approximately tangent to the interior wall of the intake port proximate the intake valve end of the intake port. By injecting sonic velocity gaseous fuel in this region after the start of airflow, the fuel follows the intake port wall toward the valve seat insert resulting in the creation of a Coanda effect.

Figure 4:
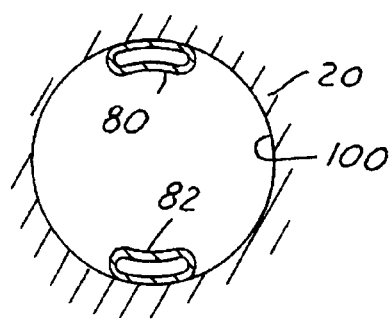
FIG. 4 is a sectional end view of the intake port of FIG. 3 along line 4—4.

Referring now to FIG. 4 there is shown a sectional view of one of the intake ports 20 of FIG. 3 taken along line 4—4. As can be seen in FIG. 4, each branch 80, 82 of the y-shaped guide tubes 70, 72 is formed such that the gaseous fuel exiting the guide tubes is entrained along the interior surface 100 of the intake port. The guide tubes themselves are also formed to generally conform to the arcuate curve of the interior surface 100 of intake port 20. The guide tube branches are formed to achieve a periphery of high velocity flow within the intake port 20.

Figure 5:
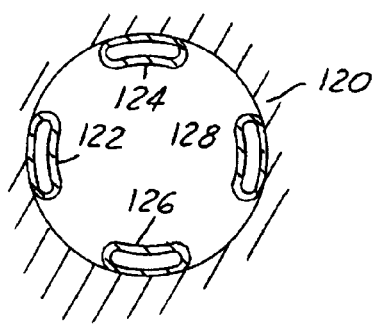
FIG. 5 is a sectional end view of an alternative guide tube and intake port arrangement according to the present invention.

Referring now to FIG. 5 there is shown a cross-sectional end view of an intake port similar to that of FIG. 4 with an alternative guide tube arrangement. Of course, FIG. 5 shows only one intake port branch 120 of which a corresponding intake port branch would exist for each intake valve of the cylinder. In the example of a two intake valve per cylinder engine and a dual injector per cylinder arrangement, branches 122 and 124 represent two branches of a four-branch guide tube associated with one injector and branches 126, 128 represent two branches of a four-branch guide tube associated with the other fuel injector. Thus, each injector has a fan-branch guide tube, with a pair of branches in each of the two intake ports. Preferably, each branch within the intake port is located approximately opposite another branch. Thus, branches 124 and 126 are opposing and branches 122 and 128 are opposing. A similar arrangement is shown in FIG. 4 with respect to branches 80, 82. Again, the branches are located as such to maximize the uniformity of the high velocity peripheral fuel flow.

Figure 6:
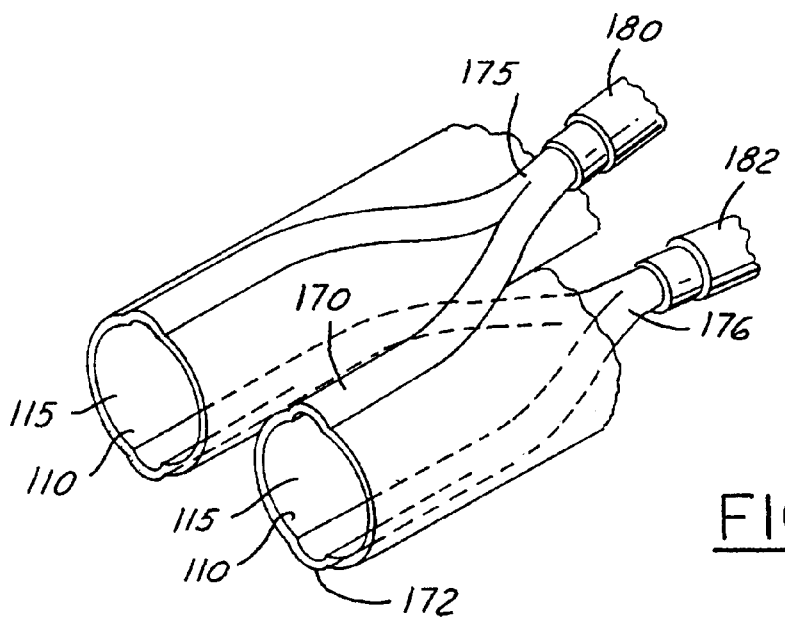
FIG. 6 is an alternative embodiment of a gaseous-fueled injection system according to the present invention.

Referring now to FIG. 6 there is shown a cross-sectional end view of an end region of an inlet port associated with an intake valve of a gaseous-fueled IC engine in accordance with another embodiment of the present invention. FIG. 6 is similar to FIG. 4 in that two branches 170, 172 of two guide tubes are shown. However, in the embodiment of FIG. 6, the fluid channels 170, 172 forming the branches are integrally formed as part of the intake port wall 110. The manufacturability and assembly of such guide tube may be simplified versus the configuration shown in FIGS. 2–5. Like the guide tubes of FIGS. 2–5, however, the integrally formed fluid channels 170, 172 of FIG. 6 are configured such that the injection of the high pressure gaseous fuel creates a high velocity peripheral airflow resulting in a lower pressure central core in the region 115 which, in turn, increases the overall intake charge flow and volumetric efficiency. A fluid conduit 175, 176 connects each of the injectors 180, 182 to the fluid channels 170, 172 associated with each intake port.

In all embodiments, the injection arrangement induces high speed flow along the intake port wall near the valve to improve the engine power density by the Coanda effect. The particular timing of the high velocity flow, of course, depends upon the particular engine under consideration. In this regard, the improved volumetric efficiency is accomplished by modifying the direction, location, duration and timing of the high pressure injection. The arrangements shown in FIGS. 2–6 are examples of direction and location embodiments contemplated by the present invention. One method of controlling the flow direction is by using the second of a two-injector system at a different flow rate than the first injector. By changing the pulse width (duty cycle) of the two injectors, the timing, duration and air-fuel ratio can be simultaneously controlled. Another method of modifying the timing and duration of the high pressure gaseous flow to achieve improved volumetric efficiency is to vary the rail pressure of each injector in a two-injector per cylinder system. For example, the first injector could deliver fuel at about 3 bar and the second at about 12 bar. Alternatively, both the pulse width and the rail pressure for each injector can be modified.

From the foregoing, it can be seen that there has been brought to the art a new and improved gaseous-fuel injection system which provides improved volumetric efficiency of gaseous-fueled engines. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A fuel injection system for a gaseous-fueled engine having a plurality of cylinders each defining a combustion chamber and including two intake ports in fluid communication with an intake manifold and separated from said combustion chamber by two intake valves operable between an open and closed position, the system comprising:
   at least one gaseous fuel injector for each of said engine cylinders wherein each fuel injector is located proximate said intake manifold; and
   a guide tube connecting each of said gaseous fuel injectors to at least one of said intake ports, said guide tube comprising a two-branched conduit wherein each branch is arranged in each of said two intake ports substantially tangent and adjacent to an interior wall of said intake port and directed toward said respective intake valve, said guide tube for delivering high pressure gaseous fuel from said injector to said respective combustion chamber along said interior wall of said intake port.

2. A fuel injection system according to claim 1 comprising two gaseous fuel injectors for each of said engine cylinders.

3. A fuel injection system according to claim 2 comprising two two-branched guide tubes, one associated with each of said two gaseous fuel injectors, wherein one branch of each of said guide tubes is located within one of said intake ports substantially tangent to an interior wall of said intake port and directed toward said respective intake valve.

4. A fuel injection system according to claim 3 wherein said guide tube branches within each of said intake ports are arranged opposite each other.

5. A fuel infection system for a gaseous-fueled engine having a plurality of cylinders each defining a combustion chamber and including two intake ports in fluid communication with an intake manifold and separated from said combustion chamber by two intake valves operable between an open and closed position, the system comprising:
   at least one gaseous fuel injector for each of said engine cylinders, wherein each fuel injector is located proximate said intake manifold; and
   a guide tube connecting leach of said gaseous fuel injectors to at least one of said intake ports, said guide tube comprising a four-branched conduit wherein a pair of branches is arranged in each of said two intake ports substantially tangent and adjacent to an interior wall of said intake port and directed toward said respective intake valve, said guide tube for delivering high pressure gaseous fuel from said injector to said respective combustion chamber along said interior wall said intake port.

6. A fuel injection system according to claim 5 wherein each branch of said pair of guide tube branches is arranged opposite each other within said respective intake port.

7. A fuel injection system for a gaseous-fueled engine having a plurality of cylinders each defining a combustion chamber and associated with at least one intake port in fluid communication with an intake manifold and separated from said combustion chamber by an intake valve operable between an open and dosed position, the system comprising:
   at least one gaseous fuel injector for each of said engine cylinders, wherein each fuel injector is located proximate said intake manifold; and
   a conduit connecting each of said gaseous fuel injectors to said respective intake port at a fluid channel, wherein said fluid channel is formed within an interior wall of said intake port substantially parallel to a direction of intake airflow and directed toward said respective intake valve, said fluid channel for delivering high pressure gaseous fuel from said injector to said respective combustion chamber along said interior wall of said intake port.

8. A fuel injection system according claim 7 wherein each of said cylinders includes two intake ports and two intake valves, and wherein said conduit comprises a two-branched conduit wherein each branch is connected to a fluid channel formed in said respective intake port.

9. A fuel injection system according to claim 8 comprising two gaseous fuel injectors for each of said engine cylinders.

10. A fuel injection system according to claim 9 comprising two two-branched conduits, one associated with each of said two gaseous fuel injectors, wherein one branch of each of said conduits is connected to a fluid channel formed in said respective intake port.

11. A fuel injection system according to claim 10 wherein said fluid channels within each of said intake ports are arranged opposite each other.

12. A gaseous-fueled internal combustion engine comprising:
   a cylinder having an intake port formed therein;
   an intake valve which selectively and alternately opens and doses said intake port;
   an air intake manifold in fluid co on with said intake port;
   a high-pressure gaseous fuel injector located proximate said intake manifold;
   a guide tube connecting said fuel injector in fluid communication with said substantially tangent and adjacent to an interior wall of said intake port and directed toward said intake valve, said fluid passage being formed into said interior wall of said intake port said guide hike for delivering high pressure gaseous fuel from said injector to said respective combustion chamber along said interior wall of said intake port.

13. A gaseous-fueled internal combustion engine comprising:
   a cylinder having two intake ports formed therein;
   two intake valves eat selectively and alternately opening and closing said respective intake ports;
   an air intake manifold fluid communication with said intake ort
   a high-pressure gaseous fuel injector located proximate said intake manifold;
   a guide tube connecting said fuel injector in fluid communication with said intake port, said guide tube comprising a two-branched fluid passage wherein each branch is arranged in each of said two intake ports substantially tangent and adjacent to an interior wall said intake port and directed toward id intake valve, said guide tube for delivering high pressure gaseous fuel from said injector to said respective combustion chamber along said interior wall of said intake port.

14. A gaseous-fueled engine according to claim 13 comprising two gaseous fuel injectors.

15. A gaseous-fueled internal combustion engine comprising:
   a cylinder having an intake port formed therein;
   an intake valve which selectively and alternately opens and closes said intake port;
   an air intake manifold in fluid communication with said intake port;
   a high-pressure gaseous fuel injector located proximate said intake manifold;
   a guide tube connecting said fuel injector in fluid communication with said intake port, said guide tube comprising a two-branched fluid passage wherein each fluid passage is arranged substantially tangent and adjacent to an interior wall of said intake port and directed toward said intake valve and wherein said fluid passages are arranged opposite each other within said intake port, said guide tube for delivering high pressure gaseous fuel from said injector to said respective combustion chamber along said interior wall of said intake port.

* * * * *